United States Patent [19]

Morita et al.

[11] 4,441,132

[45] Apr. 3, 1984

[54] MAGNETIC HEAD DEVICE

[75] Inventors: Shigetoshi Morita; Hirohide Yamada, both of Kumagaya, Japan

[73] Assignee: Hitachi Metals, Ltd., Tokyo, Japan

[21] Appl. No.: 371,580

[22] Filed: Apr. 26, 1982

[30] Foreign Application Priority Data

Apr. 30, 1981 [JP] Japan .................................. 56-65723

[51] Int. Cl.³ ........................... G11B 5/16; G11B 5/22
[52] U.S. Cl. .................................... 360/126; 360/122; 360/118
[58] Field of Search ................ 360/126, 125, 119–122, 360/118, 127–128

[56] References Cited

U.S. PATENT DOCUMENTS 3,846,840 11/1974 Childers et al. ................ 360/121 X
4,058,846 11/1977 Knutson et al. .................... 360/121

Primary Examiner—John H. Wolff
Attorney, Agent, or Firm—Antonelli, Terry & Wands

[57] ABSTRACT

A magnetic head device comprising a recording/playback magnetic head and erasing magnetic head, each of which consisting of cores made from a ferrite of Mn-Zn system and a reinforcement plate made from a non-magnetic ceramic material and bonded to respective cores; and sliders made from a non-magnetic ceramic material and united with the magnetic heads. The non-magnetic ceramic material for the sliders has a thermal expansion coefficient which is at least $5 \times 10^{-7}/°C.$ greater than that of the non-magnetic ceramic material for the reinforcement plate.

2 Claims, 2 Drawing Figures

MAGNETIC HEAD DEVICE

BACKGROUND OF THE INVENTION

The present invention relates to a magnetic head device in which a recording/playback magnetic head and an erasing magnetic head are constructed as a unit. More particularly, the invention is concerned with a magnetic head device incorporating ferrite cores of Mn-Zn system.

DESCRIPTION OF THE PRIOR ART

Figure 1:
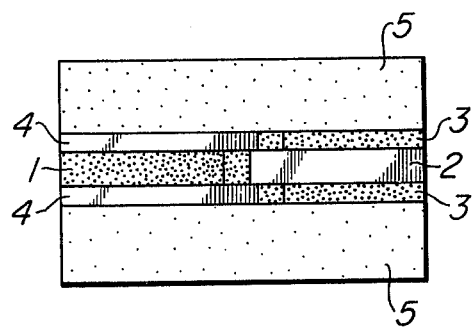
FIG. 1 is a schematic front elevational view of a magnetic head device in accordance with an embodiment of the invention.
Figure 2:
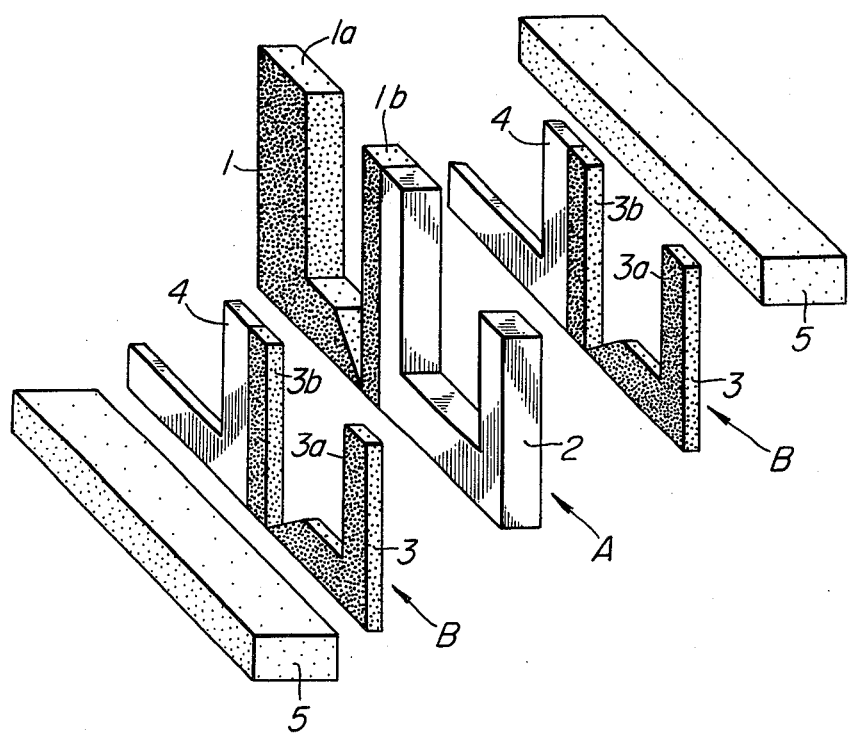
FIG. 2 is an exploded view of the magnetic head device shown in FIG. 1.

Referring to FIGS. 1 and 2, a magnetic head device incorporates a recording/playback magnetic head A and a pair of erasing magnetic head B disposed at both sides of the recording/playback magnetic head A. The recording/playback magnetic head A includes a recording/playback head core 1 constituted by a pair of ferrite cores 1a and 1b glass-boded to each other, and a reinforcement plate 2 bonded to the recording/playback magnetic head core 1 by means of glass or resin. Similarly, each erasing magnetic head B includes an erasing magnetic head core 3 consisting of a pair of ferrite cores 3a and 3b glass-bonded to each other, and a reinforcement plate 4 bonded to the erasing magnetic head core 3 by means of glass or resin. As will be seen from Figures, sliders 5 are disposed at the outer sides of the pair of erasing magnetic head B which sandwich therebetween the recording/playback magnetic head A. These constituents A, B and 5 are mutually integrated into a unit by bonding with glass or resin to form a magentic head device.

In recent years, there is an increasing demand for increasing the density of the magnetic recording. As a measure for coping with this demand, it has been proposed to decrease the width of the track. Conventionally, ferrites of Ni-Zn system have been used as the material of the magnetic head cores 1 and 3. Such materials, however, suffer a disadvantage that the electromagnetic conversion property is deteriorated when the core thickness is decreased. Under this circumstance, recently, it has been attempted to use magnetic cores made of ferrites of Mn-Zn system.

The use of ferrites of Mn-Zn system, however, increases a tendency of cracking of the ferrite core which has not been experienced materially in the conventional magnetic head core, thereby deteriorating the reliability of the magnetic head device.

SUMMARY OF THE INVENTION

Accordingly, an object of the invention is to provide a magnetic head device free from the problem such as cracking and, hence, having a high reliability, wherein the magnetic head cores are made from a ferrite of Mn-Zn system which inherently has a high electromagnetic conversion efficiency even if the track width is reduced, thereby to overcome the above-described problems of the prior art.

To this end, according to the invention, there is provided a magnetic head device in which a non-magnetic ceramics constituting the reinforcement plates for the recording/playback magnetic head and for the erasing magnetic head and a non-magnetic ceramics constituting the slider are different ceramics having different co-efficient of thermal expansion.

The present inventors have carried out various studies and experiments to clarify the reason why the cracking, which has not been experienced with the magnetic head core of Ni-Zn system ferrite, occurs in the magnetic head cores made from Mn-Zn system ferrite. As a result thereof, the inventors have found that the cracking is attributable to the difference in coefficient of thermal expansion between the core material and the material of the reinforcement plate or between the core material and the material of the slider. The present invention is based upon this newly found out fact. Namely, in the conventional magnetic head device, the reinforcement plates for the recording/playback magnetic head and for the erasing magnetic head and the sliders are made from the same non-magnetic ceramic material. The condition for bonding the reinforcement plates to the cores for forming the recording/playback magnetic head or the erasing magnetic head and the condition for bonding the sliders to these heads so as to form an integrated magnetic head device are different from each other. This difference adversely affect the magnetic head device as the product. According to the invention, the properties of the non-magnetic ceramic materials are suitably selected so that the bad influence due to the abovementioned difference in condition for bonding can be substantially eliminated when Mn-Zn system ferrite is used.

More specifically, according to the invention, more preferable result is obtained when the ceramic material used in the sliders has a coefficient of thermal expansion which is at least $5 \times 10^{-7}/°C$. greater than that of the ceramic material used in the recording/playback magnetic head and the erasing magnetic head.

DESCRIPTION OF THE PREFERRED EMBODIMENTS

The invention will be more fully understood from the following description of the preferred embodiments.

EMBODIMENT 1

A recording/playback magnetic head and an erasing head were formed by using a ceramic material having a coefficient of thermal expansion of $110 \times 10^{-7}$ as the material of the reinforcement plates. The reinforcement plates were glass-bonded to the cores made from a ferrite of Mn-Zn system to form respective magnetic heads. On the other hand, sliders were prepared using three kinds of ceramics as the material: namely, a ceramic material having a thermal expansion coefficient of $100 \times 10^{-7}$, a ceramic material having a thermal expansion coefficient of $110 \times 10^{-7}$ and a ceramic material having a thermal expansion coefficient of $115 \times 10^{-7}$. A plurality of magnetic head devices were produced by resin-bonding these magnetic heads to the sliders in various combinations. A test result showed that only the magnetic head device incorporating sliders made from the ceramic material having thermal expansion coefficient of $115 \times 10^{-7}$ did not suffer cracking in Mn-Zn ferrite core.

EMBODIMENT 2

A recording/playback magnetic head and an erasing magnetic head were produced by glass-bonding reinforcement plates of a ceramic material having a thermal expansion coefficient of $105\times10^{-7}$. On the other hand, sliders were prepared from three kinds of ceramics as the material: namely, a ceramic material having a thermal expansion coefficient of $100\times10^{-7}$, a ceramic material having a thermal expansion coefficient of $110\times10^{-7}$ and a ceramic material having a thermal expansion coefficient of $115\times10^{-7}$. The magnetic heads and the sliders were resin-bonded in various combinations to form a plurality of magnetic head devices. A test result showed that the devices incorporating the sliders of thermal expansion coefficients of $110\times10^{-7}$ and $115\times10^{-7}$ did not exhibit any cracking.

EMBODIMENT 3

A recording/playback magnetic head and an erasing magnetic head were produced by glass-bonding reinforcement plates made from a ceramic material having a thermal expansion coefficient of $100\times10^{-7}$. On the other hand, sliders were prepared using five kinds of ceramics as the materials: namely, ceramic materials having thermal expansion coefficients of $95\times10^{-7}$, $100\times10^{-7}$, $105\times10^{-7}$, $110\times10^{-7}$ and $115\times10^{-7}$. The magnetic heads were resin-bonded to the sliders in various combinations to form a plurality of magnetic head devices. A test result showed that the devices incorporating sliders having thermal expansion coefficients of $105\times10^{-7}$, $110\times10^{-7}$ and $115\times10^{-7}$ did not show any cracking.

As has been described, according to the invention, it is possible to eliminate the problem of cracking in the magnetic head cores made from ferrites of Mn-Zn system, so that it becomes possible to produce, in an industrial scale, highly reliable magnetic head devices having reduced track width, thereby bringing about a great advantage in the field of industry concerned.

What is claimed is:

1. A magnetic head device comprising a recording playback magnetic head and erasing magnetic head; each of which consisting of cores made from a ferrite of Mn-Zn system and a reinforcement plate made from a non-magnetic ceramic material and bonded to respective cores; and sliders made from a non-magnetic ceramic material and united with said magnetic heads; wherein said non-magnetic ceramic material for said reinforcement plate and said non-magnetic ceramic material for said sliders have thermal expansion coefficients different from each other.

2. A magnetic head device as claimed in claim 1, wherein the thermal expansion coefficient of said non-magnetic ceramic material for said sliders is at least $5\times10^{-7}/°C$. greater than that of said non-magnetic ceramic material for said reinforcement plate.

* * * * *